US008115338B2

(12) United States Patent  (10) Patent No.: US 8,115,338 B2
Medugno  (45) Date of Patent: Feb. 14, 2012

(54) EMERGENCY POWER UNIT

(76) Inventor: Rodolfo Medugno, Turin (IT)

( * ) Notice: Subject to any disclaimer, the term of this patent is extended or adjusted under 35 U.S.C. 154(b) by 215 days.

(21) Appl. No.: 12/391,660

(22) Filed: Feb. 24, 2009

(65) Prior Publication Data

US 2009/0212632 A1  Aug. 27, 2009

(30) Foreign Application Priority Data

Feb. 25, 2008 (WO) ................. PCT/IT2008/000126
Jan. 8, 2009 (EP) ..................... 09150194

(51) Int. Cl.
*H02J 7/00* (2006.01)
*H02J 9/00* (2006.01)
(52) U.S. Cl. ......................................... 307/66
(58) Field of Classification Search .................... 307/19, 307/29, 64, 66, 115
See application file for complete search history.

(56) References Cited

U.S. PATENT DOCUMENTS

| 6,057,609 | A | 5/2000 | Nagai et al. | |
| 6,225,708 | B1 | 5/2001 | Furukawa et al. | |
| 7,053,502 | B2 * | 5/2006 | Aihara et al. | 307/46 |
| 7,294,940 | B2 | 11/2007 | Grolnic et al. | |
| 7,709,976 | B2 | 5/2010 | Bazinet | |
| 2004/0189094 | A1 * | 9/2004 | Hori | 307/29 |
| 2007/0262651 | A1 | 11/2007 | Odaohara | |
| 2008/0042492 | A1 | 2/2008 | Gleason et al. | |

FOREIGN PATENT DOCUMENTS

WO  2007/011370 A1  1/2007

* cited by examiner

*Primary Examiner* — Jared Fureman
*Assistant Examiner* — Carlos Amaya
(74) *Attorney, Agent, or Firm* — Sughrue Mion, PLLC

(57) ABSTRACT

The present invention relates to an emergency power unit for apparatuses, in particular domestic apparatuses, which unit comprises a battery charging device (61) having an input connected to a connector (12, 14, 15) and comprising accumulator means (63*a*), arranged to accumulate electric power coming from the connector (12, 14, 15), and conversion means (65, 65*a*) arranged to convert the electric power accumulated into a power supply that can be used by the apparatuses and to output said power supply to the apparatuses. The unit further comprises a power supply delivery device (71) comprising: first connection means (12, 14) connectable to first power supply means by means of first connection cables for being supplied with power; second connection means (22, 24) connectable to at least one of the apparatuses to supply it with power; and switching means (72) arranged to switch the connection from the first connection means (12, 14) to the conversion means (65) and vice versa to provide the power supply. The invention also relates to a method of supplying apparatuses by means of an emergency power unit in case of blackout in an electric mains.

22 Claims, 4 Drawing Sheets

EMERGENCY POWER UNIT

TECHNICAL FIELD

The present invention relates to an emergency power unit, capable of ensuring, in case of electrical blackout, continued operation to various devices or apparatuses, for instance devices to be used at home or in an office.

More particularly, the present invention relates to an emergency power unit for domestic devices or apparatuses, such as telephones, modems, IP (Internet Protocol) routers, to which reference is preferably made hereinafter.

PRIOR ART

It is known that many devices, in particular devices used for Internet communications, demand continued (or no-break) power supply for their operation. Actually, whereas telephones connected to fixed telephone lines are capable of operating independently of whether the electric mains is operating or in blackout, IP devices demanding the presence of a modem and possibly of a router can operate only if the mains is operating.

Such a situation clearly represents a problem, since any connection involving such devices is dropped in case of electrical blackout.

It is also known that emergency power units exist, which accumulate power and deliver it as an a.c. voltage and current in case of electrical blackout.

Such units are generally used in industry, but they are not used, nor can be used, at home or in an office both for problems of costs and noise, and because they should be dimensioned so as to provide continued power supply also to apparatuses or devices whose operation in case of blackout is not strictly necessary.

In practice, the Applicant has realised that, while the demand for communications over the IP network is increasing, in particular at home, means capable of ensuring continued operation of IP devices in case of electrical blackout are lacking.

DESCRIPTION OF THE INVENTION

It is an object of the present invention to solve the problems of the prior art discussed above.

The object is achieved by means of the emergency power unit as claimed.

The present invention also concerns a method for providing continued power supply to devices in case of electrical blackout.

The claims are integral part of the technical teaching provided here in respect of the invention.

In accordance with a feature of a preferred embodiment of the present invention, the emergency power unit comprises a first set of connectors connectable to power supply units of devices or apparatuses, in particular of domestic type, a second set of connectors connectable to the apparatuses, and a power supply switching means configured to switch the power supply from the power supply units to a battery charging device.

In accordance with another feature of the present invention, the battery charging device is configured to provide the apparatuses with a power supply having predetermined characteristics.

In accordance with a further feature of the present invention, the switching device is configured to switch the connection from the power supply units to the battery charging device substantially instantaneously and to switch the connection from the battery charging device to the power supply units with a predetermined delay.

BRIEF DESCRIPTION OF THE FIGURES

The above and other features and advantages of the present invention will become apparent from the following description of preferred embodiments thereof, made by way of non limiting example with reference to the accompanying Figures, in which elements denoted by the same or similar numerical reference are elements having the same or similar function and construction, and in which.

DETAILED DESCRIPTION OF A PREFERRED EMBODIMENT

Figure 1:
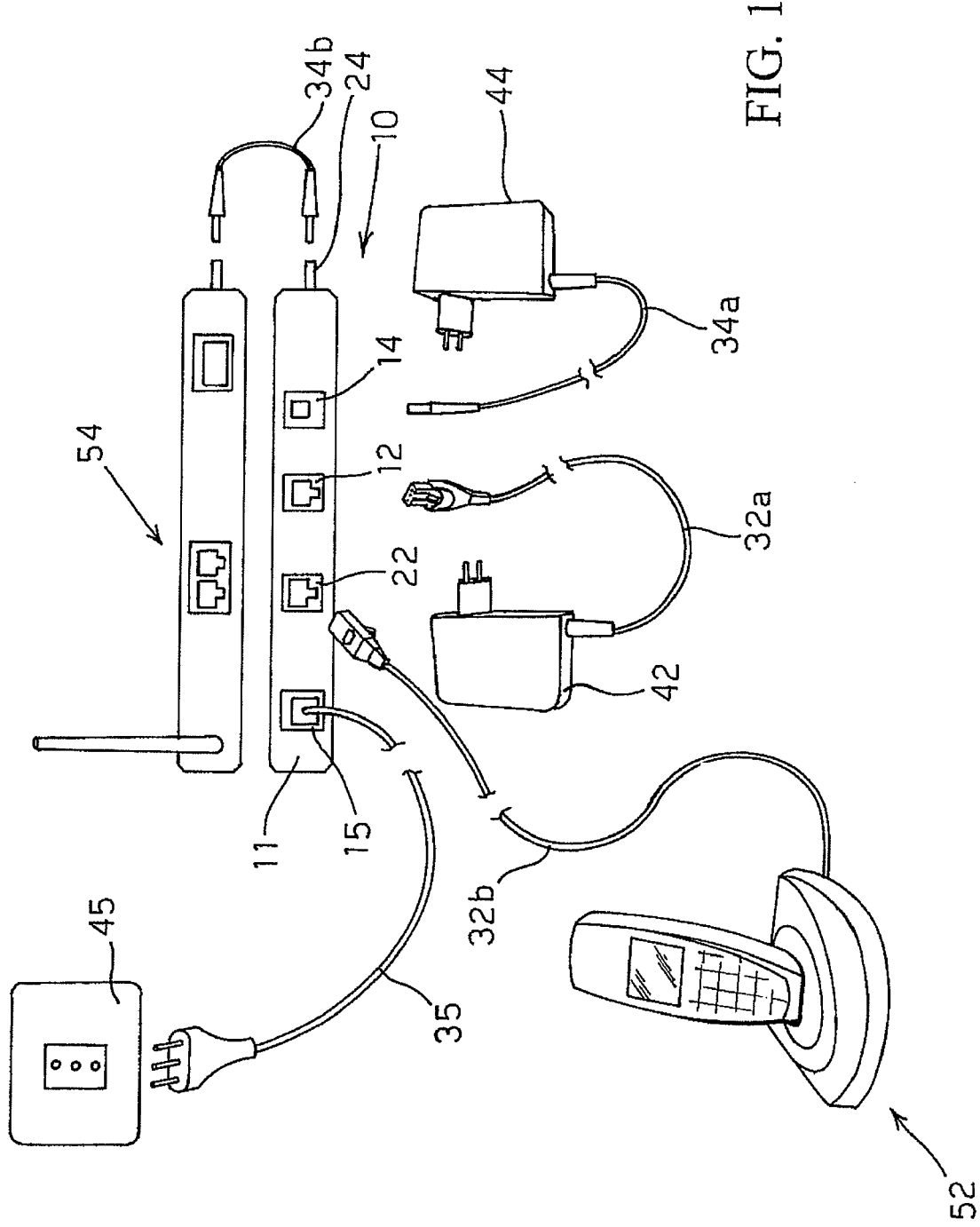
FIG. 1 shows a system comprising the emergency power unit according to the invention.

Referring to FIG. 1, an emergency power unit 10 according to the invention comprises a casing 11 inside which several management and control devices are included, as it will be disclosed in detail below, and a plurality of connecting means arranged to perform continued power supply functions.

According to a first embodiment, unit 10 comprises, for instance, a first input connector 12 arranged to be connected, through a first input cable 32a, to a first power supply unit 42 for a first device or apparatus 52, for instance an IP (Internet Protocol) telephone set, known per se.

Such a first input connector 12 is associated with a first output connector 22, arranged to be connected to the first device 52 through a first output cable 32b, preferably having the same electromagnetic characteristics as the first input cable 32a.

According to such an embodiment, unit 10 further comprises a second input connector 14 arranged to be connected, through a second input cable 34a, to a second power supply unit 44 for a second device or apparatus 54, for instance an IP modem, known per se.

Such a second input connector 14 is associated with a second output connector 24, arranged to be connected to the second device 54 through a second output cable 34b, preferably having the same electromagnetic characteristics as the second input cable 34a.

Of course, according to further embodiments, the number of mutually associated input and output connectors can be smaller or greater than two, without thereby departing from the scope of the invention as described and claimed.

The unit further comprises, according to a first embodiment, a connector 15 arranged to be connected to a mains socket 45, known per se, through an electric cable 35 of known type, for supplying the same unit.

In further embodiments, the unit comprises a further connector arranged to allow supplying, through a further electrical cable, a further emergency power unit having substantially the same characteristics as emergency power unit 10 described herein.

According to a second embodiment, in particular when the number of input and output connectors is limited to one or two, the connector 15 can be missing and the unit can be supplied or powered by the input connector/connectors 12 and/or 14 respectively, as will be disclosed below in detail.

Figure 2A:
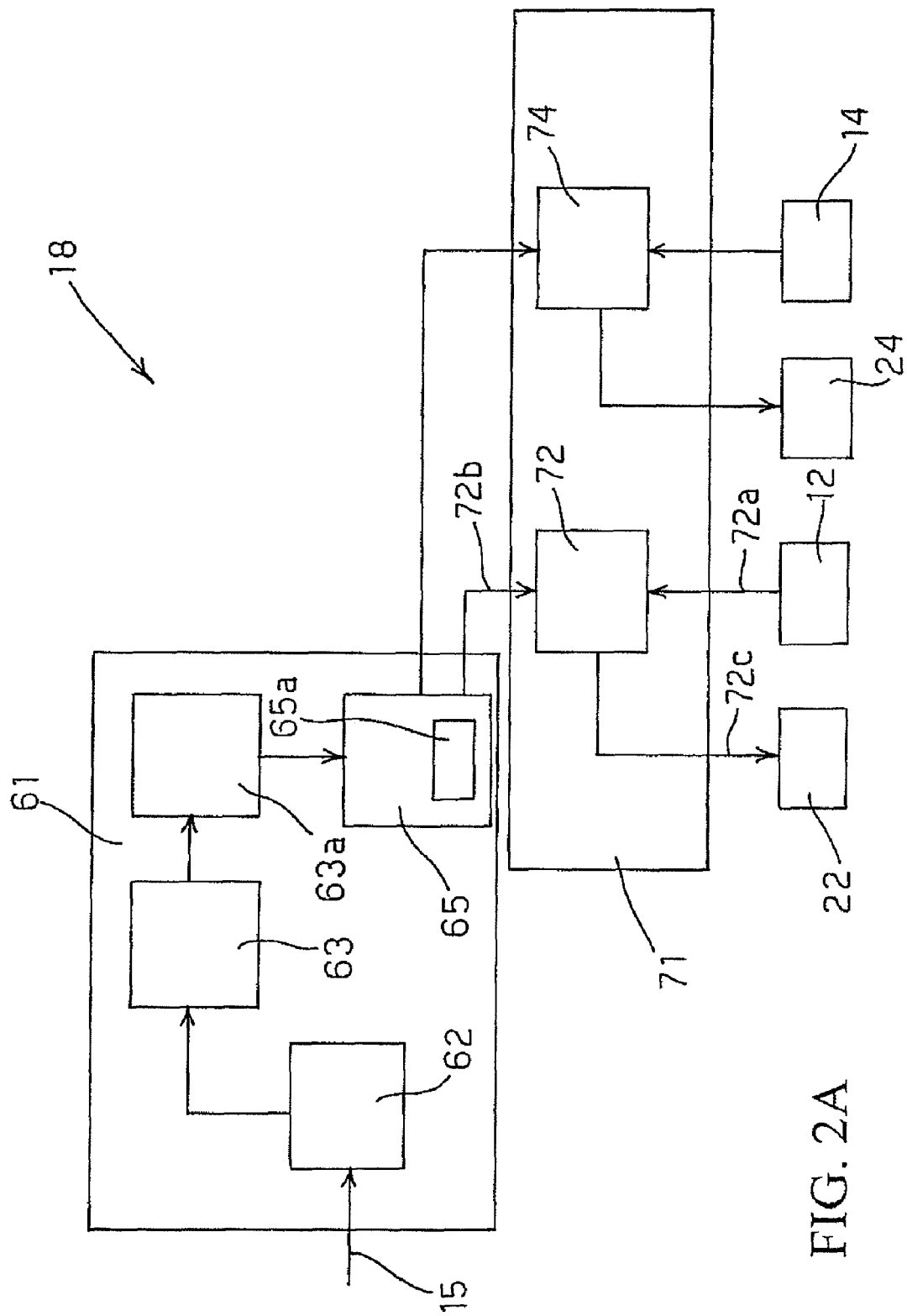
FIG. 2a shows a block diagram of the electronic circuitry of the emergency power unit according to a first embodiment of the invention.
Figure 2B:
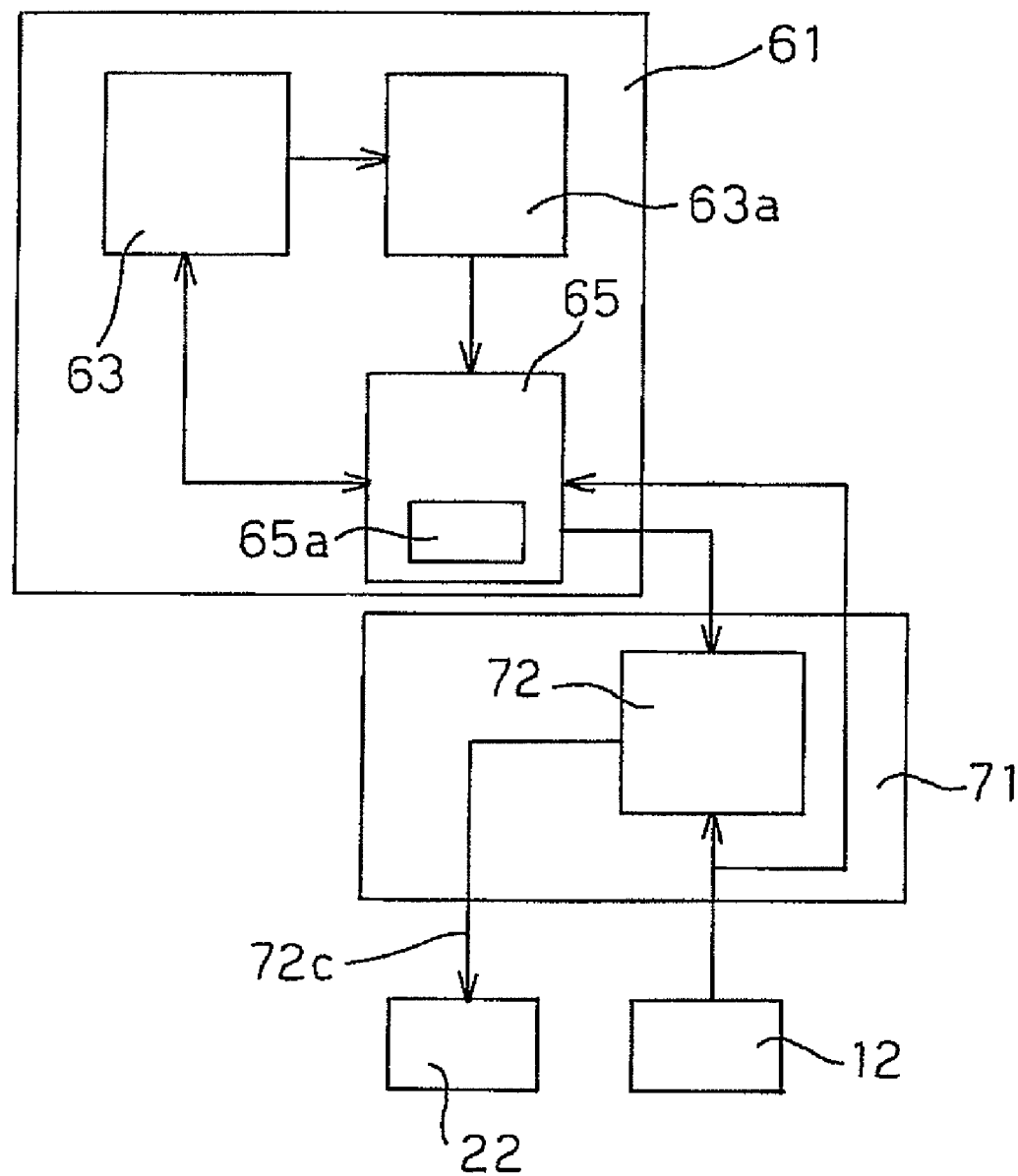
FIG. 2b shows a block diagram of the electronic circuitry of the emergency power unit according to a second embodiment of the invention.
Figure 3:
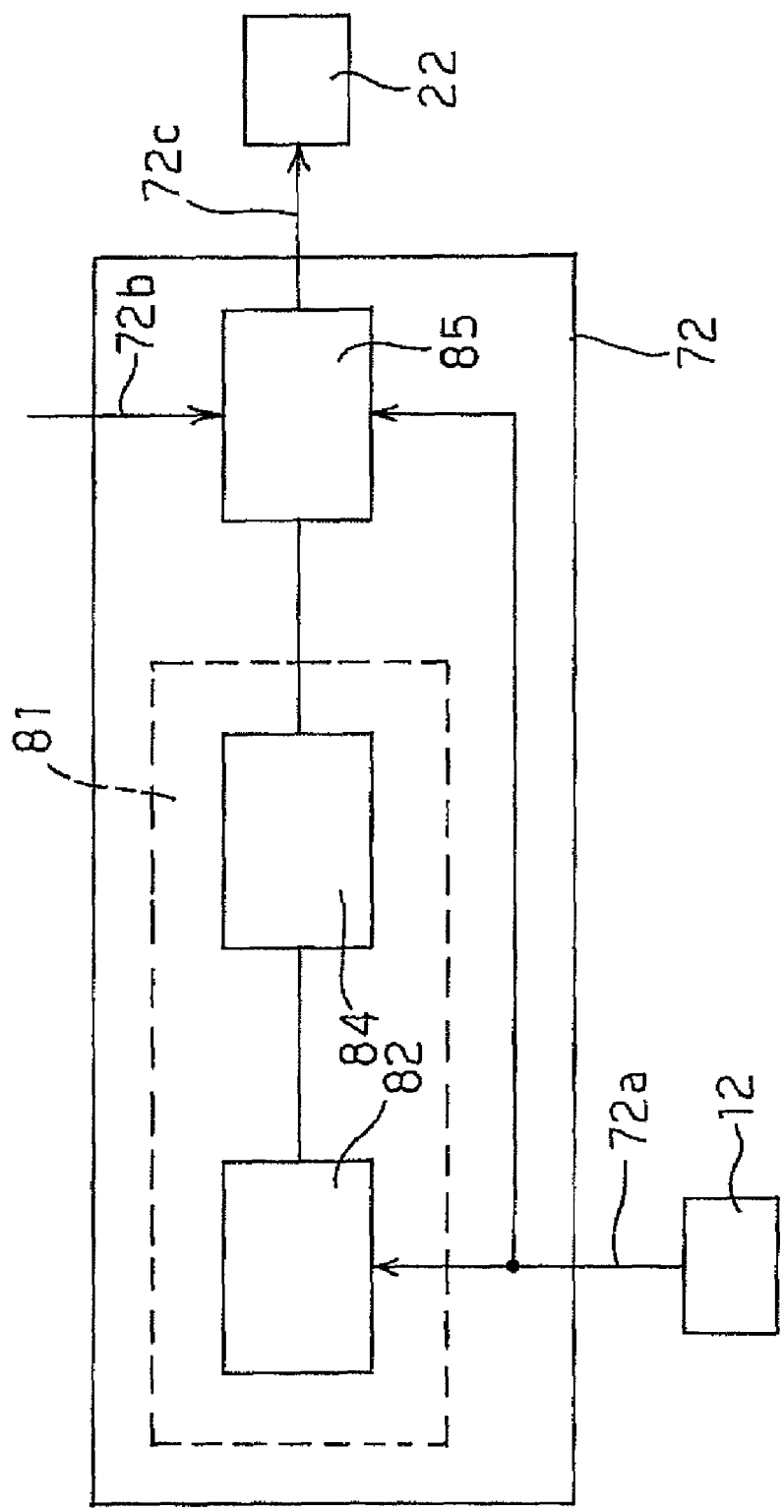
FIG. 3 shows a block diagram of a component of the electronic circuitry of the emergency power unit of FIG. 2a or 2b.

In the preferred embodiment, emergency power unit 10 includes, inside casing 11, an electronic circuit 18 (FIG. 1, FIG. 2a, FIG. 2b).

Said electronic circuit 18 is arranged, when the mains is operating, to supply domestic devices 52 and/or 54 by using power supply units 42 and 44 and input and output cables 32a and 32b, and/or input and output cables 34a and 34b, respectively, and, in case of a blackout on the mains, to autonomously supply domestic devices 52 and/or 54 by using output cables 32b and 34b, respectively, as disclosed in detail hereinafter.

In the preferred embodiment, circuit 18 comprises a battery charging device 61, of known type, and a supply delivery or supply switching device 71, connected in known manner to the battery charging device and arranged to receive power supply, for instance d.c. power supply, from battery charging device 61 and input connectors 12 and 14.

Battery charging device 61 that, in use, according to first embodiment (FIG. 1, FIG. 2a) is connected to the mains through electric cable 35, comprises:
- means 62 for alternate current to direct current conversion (AC/DC converter), of known type, for instance AC/DC converter component model LM2586 of company National;
- a battery charger 63, of known type, for instance battery charger Model D2 100V 1° of company VISHAI, associated with one or more batteries (battery stack) 63a, of known type, for instance a sealed lead battery stack Model CJ6-7.2 of company STANDHBS;
- a unit 65 for direct current to direct current conversion (DC/DC converter), including a microprocessor 65a and configured so as to receive d.c. voltage from battery stack 63a at its input and to preferably provide at its output, as it will be disclosed in detail below, a plurality of voltage and current values according to settings previously determined when manufacturing electronic circuit 18.

More particularly, according to the preferred embodiment, DC/DC converter 65 comprises an electronic circuitry that, when suitably jumped, is capable of supplying output connectors 22 and 24, respectively, for instance with different voltage values with different currents and quality, through supply delivery or switching unit 71.

For instance, depending on the jumper positions and based on programs developed during the design phase of unit 10 and stored in microprocessor 65a, microprocessor 65a associates with the output connectors respective voltages and currents, corresponding with those entering through the respective input connectors 12 and 14.

The voltage and current values can be included into a table stored in microprocessor 65a and suitably selected by the programs developed and stored therein.

Of course, in other embodiments, an external control unit can be provided, arranged to configure DC/DC converter 65 at the factory so as to assign, through microprocessor 65a, the voltage and current values envisaged on output connectors 22 and 24, respectively.

Supply delivery unit 71 preferably comprises one or more than one switching circuits, their number corresponding to the number of output connectors. In the example, supply delivery unit 71 comprises a first switching circuit 72 and a second switching circuit 74.

As it will be disclosed in detail below, switching circuits 72 and 74 are arranged:
- when the power supply is provided by the operating mains, to supply the domestic devices with power by using the power supply from input connectors 12 and/or 14;
- at the occurrence of an electrical blackout, to switch very quickly, e.g. within a time not exceeding 500 µs, the power supply from connectors 12 and/or 14 to the power supply from DC/DC converter 65; and
- when the mains is restored, to restore the power supply from input connectors 12 and/or 14 with a sufficient delay for ensuring stability of the power supply from power supply units 42 and/or 44, e.g. a delay not lower than 5 s.

Both switching circuits 72 and 74 have substantially the same structure so that, for sake of simplicity of the description, only the first of such circuits is described herein, assuming that the second has an identical structure.

For instance, switching circuit 72 (FIGS. 1, 2a, 2b and 3) has a first input 72a connected to the first input connector 12, a second input 72b connected to an output of DC/DC converter 65, and an output 72c connected to output connector 22. Moreover, switching circuit 72 comprises for instance an electronic circuit 81 and a micro-switch 85 connected in series.

In the preferred embodiment, electronic circuit 81 comprises a detector 82 connected to the first input 72a and capable of detecting a possible blackout or restoration of the mains, and a control logic 84, connected to detector 82 and arranged to receive and handle signals representative of the blackout or the restoration and to consequently control microswitch 85, as disclosed in detail below.

More particularly, according to the preferred embodiment, control logic 84 comprises a microprocessor logic so programmed that, at the occurrence of a signal representative of a blackout, the logic commands micro-switch 85 to switch the power supply from the first input 72a to the second input 72b connected to DC/DC converter 65. Preferably said switching operation, as it can be readily understood by a person skilled in the art, is performed by switching micro-switch 85 to an open condition so that the switching time is extremely short, e.g. lower than or equal to 500 µs.

Control logic 84 is also programmed or configured so that, at the occurrence of a signal representative of the restoration of the power supply from the mains, coming from detector 82, the logic:
- activates a delay line or a line generating a delay period, e.g. a delay of at least 5 s;
- checks, during said period, the occurrence of possible other blackout signals: in such case the delay line is activated again for a further delay period, for instance increasing in predetermined manner;
- activates the micro-switch so that it provides again output connector 22 with the power supply from input connector 12, after the delay period.

As it can be readily understood by a person skilled in the art, the described configuration of each switching circuit 72 or 74, respectively, and in particular of control logic 84, ensures that each break of the power supply from the mains is handled very quickly, whereas the restoration of the power supply from the mains is controlled so as to prevent instability in the supply of domestic devices.

According to the second embodiment it is provided that, in particular when the number of input and output connectors is limited to one or two, the input connector/connectors (12, 14)

is (considering one input connector) connected to the switching circuit 72 (FIG. 2b, FIG. 3) and in parallel to the DC/DC converter 65.

According to this embodiment the switching circuit 72 is configured and operates in the same way as already disclosed.

On the contrary, the DC/DC converter is DC powered from the input connector/connectors 12 and/or 14 and in turn it powers the battery charger 63 for charging the battery stack 63a in the same way as already disclosed in relation with the first embodiment.

Obviously, as readily understandable by a technician in the field, the electrical power received from the DC/DC converter 65, as for example from the power supply unit 42 through the input connector 12 (the same reasoning is valid as regards the power supply unit 44 and the connector 14), is, in general terms, properly choked by a current limiter, of known type, provided for avoiding overloading and fault of the power supply unit 42 due to power supply overloading.

Such an embodiment, advantageously, allows to avoid the connector cable 15 because the input connector/connectors 12 and/or 14 are arranged to provide power supply to the battery charger 61 through the DC/DC converter 65.

The operation of the emergency power unit described above is as follows.

If the mains is operating, the various domestic devices 52 and/or 54 are supplied by the respective power supply units 42 and 44 through cables 32a and 32b, and/or 34a and 34b.

In such a situation, output cables 32b and 34b should conveniently have such electromagnetic characteristics that they do not modify the electromagnetic behaviour of the devices connected thereto. Preferably, such condition is generally obtained by using output cables 32b and 34b with substantially the same length and characteristics as input cables 32a and 34a.

In case of electrical blackout, referring to the first switching circuit 72, detector 82 instantaneously detects the voltage drop and signals it to control logic 84, which causes the almost instantaneous switching of micro-switch 85, so as to supply apparatus 52 by means of battery stack 63a.

During such phase, a possible short restoration of the mains, for instance a restoration with duration shorter than a predetermined time period, is detected by detector 82 but is stopped by control logic 84 that maintains micro-switch 85 switched so that power continues being supplied by battery stack 63a.

In case the mains restoration has duration equal to or longer than the predetermined time period, still referring to the first switching circuit 72, control logic 84 commands the switching of micro-switch 85 so as to supply device 52 by means of power supply unit 42.

Of course, the same operations as disclosed with reference to the first switching circuit 72 are carried out by second switching circuit 74 in respect of apparatus 54.

The description has referred to an emergency power unit comprising two input and output power supply connectors; yet, as it can be readily understood by a person skilled in the art, the emergency power unit can comprise a number of input and output connectors varying depending on specific installation requirements.

The emergency power unit can also comprise one or more LEDs connected, for instance, to the electronic circuit and arranged to signal different operation conditions, such as for instance:
  operating mains;
  electrical blackout;
  charge level of the battery stack;
  and so on.

Of course, obvious changes and modifications can be made in the above description, in respect of the size, shape, materials, components, circuit elements, connections and contacts, as well as in respect of the details of the circuitry, the illustrated construction and the method of operation, without departing from the invention as defined in the appended claims.

The invention claimed is:

1. An emergency power unit for apparatuses, the unit comprising:
  at least one connector connectable to a mains socket;
  a battery charging device having an input connected to said at least one connector the battery charging device comprising:
    accumulator means arranged to accumulate electric power coming from said at least one mains connector; and
    conversion means, arranged to convert the accumulated electric power into a power supply that can be used by the apparatuses and to output said power supply;
  the emergency power unit further comprising a power supply delivery device comprising:
    first connection means connectable to first power supply means by means of at least one respective connection cable for being supplied with power;
    second connection means connectable to at least one of said apparatuses to supply it with power;
    switching means connected to the output of said conversion means and arranged to switch the connection from said first connection means to said conversion means and vice versa to provide the power supply;
    at least one detector arranged to detect the presence of power at the first connection means;
    at least one control logic having an input connected to the detector; and
    at least one switching circuit controlled by the control logic in order to switch the connection from at least one of said first connection means to at least one of said conversion means and vice versa; and
    wherein said at least one control logic comprises means arranged to cause the substantially instantaneous switching of said switching circuit from said first connection means to said conversion means, and to cause the switching from said conversion means to said first connection means with a predetermined delay.

2. The emergency power unit as claimed in claim 1, wherein said at least one connector comprises said first connection means and in that said first connection means is arranged to provide DC electrical power by means of said first power supply means.

3. The emergency power unit as claimed in claim 1, wherein said at least one connector is arranged to provide AC electrical power.

4. The emergency power unit as claimed in claim 1, wherein said conversion means comprise at least one device for DC to DC conversion.

5. The emergency power unit as claimed in claim 1, wherein said conversion means comprise at least one circuit configured to supply the switching means with a plurality of voltage and current values according to predetermined settings.

6. The emergency power unit as claimed in claim 1, comprising at least one second connection cable associated with the second connection means and having substantially the same electromagnetic characteristics as said at least one first connection cable.

7. The emergency power unit as claimed in claim 1, wherein said accumulator means comprises one or more batteries.

8. A method of supplying power to one or more apparatuses by means of an emergency power unit in case of blackout in an electric mains, the method comprising the steps of:
accumulating electric power from the mains;
converting, by means of conversion means the accumulated electric power in a power supply that can be used by said one or more apparatuses;
supplying said one or more apparatuses with power by means of first connection means connectable to the mains and of second connection means connectable to said one or more apparatuses through said emergency power unit;
switching the power supply coming from said first connection means or from said conversion means in case of blackout in the mains for powering said one or more apparatuses;
detecting the presence of power at the first connection means;
substantially instantaneously switching the power supply from said first connection means to said conversion means in case the absence of power is detected at the first connection means; and
switching the connection from said conversion means to said first connection means with a predetermined delay if power is detected at the first connection means.

9. The method as claimed in claim 8, wherein the conversion step comprises conversion of a DC current into a DC power supply.

10. An emergency uninterruptible power unit for apparatuses arranged to be externally powered by an external AC/DC adapter having an output DC value, the unit comprising:
a DC connection through which the external AC/DC adapter powers the emergency uninterruptible power unit and its respective apparatuses;
a battery charging device arranged to accumulate electric power into an accumulator through the DC connection, said battery charging device comprising a converter comprising an input connectable to an output of the accumulator and arranged to convert the electric power accumulated by said accumulator into a power supply having a value output equal to said DC value;
an output connection to at least one of said apparatuses to supply said at least one of said apparatuses with power supply;
a switching device arranged to switch, in use, connection of the output connection between the DC connection and said converter for uninterruptedly powering said at least one of said apparatuses as a function of a blackout or restoration of AC electric power to said AC/DC external adapter.

11. The emergency power unit as claimed in claim 10, wherein said DC connection is arranged to provide DC electrical power to said battery charging device.

12. The emergency power unit as claimed in claim 10, further comprising an AC connection arranged to provide AC electrical power to said battery charging device.

13. The emergency power unit as claimed in claim 10, wherein said converter comprises at least one DC/DC conversion device.

14. The emergency power unit as claimed in claim 10, wherein said converter comprises at least one circuit configured to supply the switching device with a plurality of voltage and current values according to predetermined settings.

15. The emergency power unit as claimed in claim 10, wherein said switching device comprises:
at least one detector arranged to detect the presence of power at the DC connection;
at least one control logic having an input connected to the detector;
at least one switching circuit controlled by the control logic to switch the connection from said DC connection to said converter and from said converter to said DC connection.

16. The emergency power unit as claimed in claim 15, wherein said control logic comprises means for causing substantially instantaneous switching of said switching circuit from said DC connection to said converter and for causing the switching from said converter to said DC connection with a predetermined delay.

17. A method of supplying, by an emergency uninterruptable power unit, one or more apparatuses arranged to be externally powered by an external AC/DC adapter with a DC value through a DC connection, the method comprising the steps of:
accumulating DC electric power from a mains through the DC connection of the emergency uninterruptable power unit;
converting with a converter the accumulated DC electric power in a power supply having a value output equal to said DC value so that said power supply can be used by said one or more apparatuses;
supplying said one or more apparatuses with power through an output connection connectable to said one or more apparatuses through said uninterruptible emergency power unit;
switching, in use, the connection of the output connection between the DC connection and said converter for uninterruptedly powering said one or more apparatuses as a function of a blackout or restoration of AC electric power.

18. The method as claimed in claim 17, wherein the converting step comprises converting the DC accumulated electric power into said DC power supply.

19. The method as claimed in any one of claims 17, wherein the switching step comprises the steps of:
detecting the presence of power at the DC connection;
substantially instantaneously switching the power supply from said DC connection to said converter when an absence of power is detected at the DC connection.

20. The method as claimed in claim 19, wherein said switching step comprises the further step of
switching the connection from said converter to said DC connection with a predetermined delay when power is detected at the DC connection.

21. An emergency power unit for apparatuses, the unit comprising:
a mains connector connectable to a mains socket;
a battery charging device having an input connected to said connector, the battery charging device comprising:
an accumulator arranged to accumulate electric power coming from said mains connector, and
a converter arranged to convert the accumulated electric power into a power supply for use by the apparatuses and to output said power supply;
the emergency power unit further comprising:
a first connector for connection to a first power supply by a connection cable for being supplied with power;
a second connector for connection to at least one of said apparatuses to supply said at least one of said apparatuses with power;

a switching circuit connected to the output of said converter and arranged to switch the connection between said first connector and said converter to provide the power supply;

at least one detector that detects the presence of power at the first connector;

at least one control logic circuit having an input connected to the detector; and at least one switching circuit controlled by the control logic circuit to switch the connection between said first connector and said converter;

wherein said at least one control logic circuit is configured to cause a substantially instantaneous switching of said switching circuit from said first connector to said converter, and to cause the switching from said converter to said first connector after a predetermined delay.

22. A method of supplying power to one or more apparatuses through an emergency power unit in case of blackout in an electric mains, the method comprising the steps of:

accumulating electric power from the mains in a battery;

converting with an electrical converter the accumulated electric power in a power supply that can be used by said one or more apparatuses;

supplying said one or more apparatuses with power through a first connection connected to the mains and a second connection connected to said one or more apparatuses through said emergency power unit;

switching the power supply coming from said first connection or from said converter in case of blackout in the mains for continued powering of said one or more apparatuses;

detecting the presence of power at the first connection;

substantially instantaneously switching the power supply from said first connection to said converter when the absence of power is detected at the first connection; and switching the connection from said converter to said first connection after a predetermined delay when power is detected at the first connection.

* * * * *